United States Patent

[11] 3,568,711

| [72] | Inventor | Maurice Katz |
| | | 71, rue Raynouard, Paris 16 eme, France |
| [21] | Appl. No. | 740,638 |
| [22] | Filed | June 27, 1968 |
| [45] | Patented | Mar. 9, 1971 |
| [32] | Priority | June 29, 1967 |
| [33] | | France |
| [31] | | 112,434 |

[54] VEHICLE SHOCK ABSORBERS
4 Claims, 5 Drawing Figs.

[52] U.S. Cl. .................................................. 137/516.11,
137/516.17, 137/525.5, 137/529, 188/88
[51] Int. Cl. ..................................................... F16k 15/02
[50] Field of Search .......................................... 137/516.11,
516.17, 516.23, 511, 512.1, 513.5; 188/88.503,
88.505, 96.51, 100; 213/43

[56] References Cited
UNITED STATES PATENTS

| 3,111,138 | 11/1963 | Humphreys et al. | 137/513.5X |
| 3,432,008 | 3/1969 | Biabaud | 188/100X |
| 3,439,703 | 4/1969 | Toda et al. | 137/513.5X |

FOREIGN PATENTS

| 750,018 | 8/1933 | France | 137/513.5 |

*Primary Examiner*—Robert G. Nilson
*Attorney*—Cameron, Kerkam & Sutton

ABSTRACT: This invention relates to hydraulic valves having a double flow control of particular use for vehicles' shock absorbers. The valve is arranged between two spaces separated by a piston of the shock absorber and comprises at least one movable obturating member subjected to the pressure of the operating fluid. In accordance with the invention, the valve comprises at least two separate channels for the passage of the fluid and these channels are of different section and mutually displaced. The channels are closed in the rest position by a support for the closure member, the larger being opened by displacements of small amplitude of the closure member and the smaller channel being substituted for the larger one by larger amplitude displacements of the closure member.

PATENTED MAR 9 1971 3,568,711
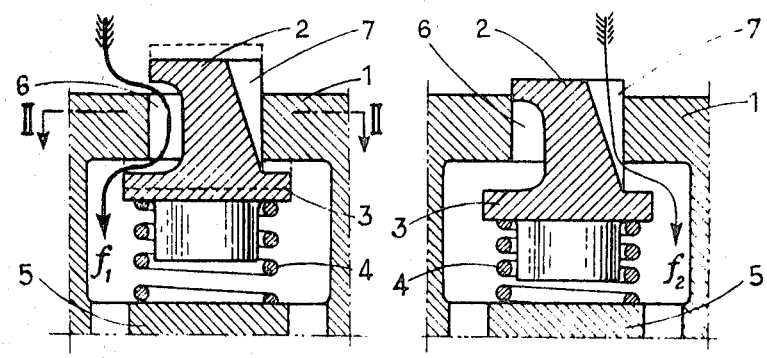
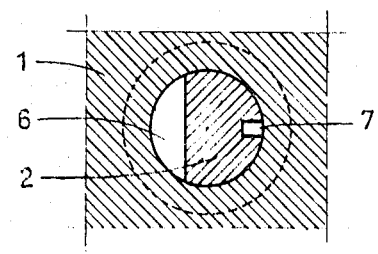
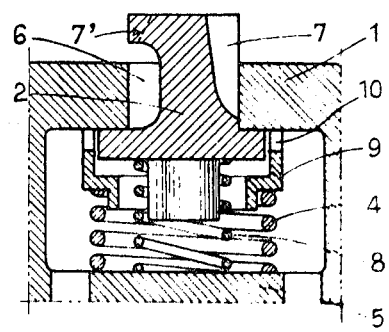
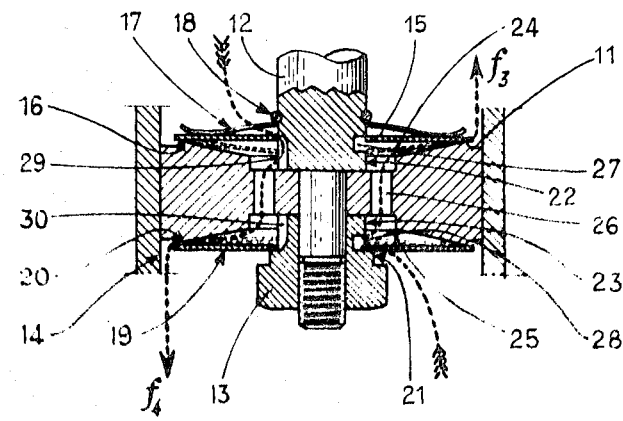

VEHICLE SHOCK ABSORBERS

The present invention relates to hydraulic valves having double flow control means, for motor vehicle shock absorbers.

The suspensions of road vehicles must satisfy very varied damping characteristics, particularly according to the surface state of the road and the speed of the vehicle.

In particular, uneven road surfaces, such as cobbles, create vibrations of low amplitude, but of very high frequency, which are transmitted by the shock absorbers to the suspended elements of the vehicle. These vibrations, which are substantial at low speed, and which arise in addition to high amplitude deformations of the suspension, are very disagreeable for the passengers and are prone to reduce the useful life of the vehicle.

In order to mitigate against the effects of the vibrations, two means are generally called upon which are used either separately or, more often, in combination.

The first of these means consists in providing elastic rings made of rubber or like material in the attachments of the shock absorber, to the two elements of which it is connected. These rings are necessarily calculated as a function of the maximum stresses to be transmitted, and consequently are too heavy in the case of small stresses; moreover, their hardness increases with age, and they then become comparatively useless for the desired purpose.

The second of these means consists in providing the shock absorber, apart from the flows of fluid upon which their hydraulic resistance depends, and which to this end are controlled by valves subjected to the action of springs, at least one permanently open conduit which permits a free transfer of fluid, and due to which the vibrations of low amplitude and of high frequency are absorbed without creating appreciable hydraulic resistance, which are capable of reflecting back on the suspended element of the vehicle. However, this section will always be added to the open section by a valve during high amplitude vibrations whose damping necessitates a high hydraulic resistance and consequently a very small section for the passage of the liquid. The result is that the desired resilience for the vibratory movements of low amplitude is incompatible with the obtaining of a high damping resistance of the high amplitude vibrations.

On the other hand, a free passage, even of small section, has the disadvantage of not permitting a damping resistance capable of preventing the slow movements of secondary vibrations, of low frequency, and this results in rolling and pitching movements, as well as exaggerated inclinations of the vehicle, causing inconvenience to the passengers and making the vehicle follow the irregularities in the road surface.

It is an object of this invention to provide a valve with double control means so as to avoid or minimize the above-mentioned disadvantages.

The invention consists in an hydraulic valve of the kind having double control means, for motor vehicles shock absorbers, arranged between spaces in the shock absorber separated by a piston thereof, and comprising at least one movable closure member subjected, upon meeting an elastic return force, to the pressure of the operating fluid, wherein said valve comprises at least two separate channels of differing section for the passage of said fluid, and mutually displaced in the direction of the displacements of the closure member, said channels being closed, in the rest position of said closure member, by a support for said member, the channel of larger section being opened by displacements of small amplitude of said closure member, under the effect of small amplitude of said closure member, under the effect of instantaneous pressures of said kind resulting from movements of low amplitude, and the channel of smaller section being substituted for said channel of larger section by displacements of higher amplitude of said closure member.

In order that the invention may be more clearly understood, reference will now be made to the accompanying drawings, which show some embodiments thereof by way of example and in which:

FIG. 1 shows a sectional view of a valve comprising a closure member with two passage sections controlled by a single return spring;

FIG. 2 shows a section along the line II–II of FIG. 1;

FIG. 3 shows a view similar to that of FIG. 1, showing the position of the closure member at the end of closing of the channel of larger section;

FIG. 4 shows a view of a second embodiment having two return springs for the closure member; and FIG. 5 shows a third embodiment having two closure members each constituted by a resilient membrane.

Referring now to the drawings, in the embodiment according to FIG. 1, a valve comprises a body 1, provided with a bore in which may slide a closure member 2 constituted by a piston provided with a flange 3 supported on the body 1 and under the influence of a spring 4, supported on a base 5 securely fixed to the body 1. On one of the sides of the closure member 2 there is a channel 6 of large section whilst a channel 7 of smaller section is provided on the opposite side of the closure member (FIG. 2); the channel 7 may have a variable section as shown in FIG. 1.

It is convenient to note that the valve shown may be arranged either on the piston of the shock absorber, the piston forming the body of the valve or of two oppositely mounted valves, or on any other suitable element of the shock absorber.

The operation of the valve is as follows:

In the rest position, the flange 3 of the closure member 2 is applied against the body 1 by the spring 4 and prevents any transfer of fluid through the channels 6 and 7. When the shock absorber is subjected to a pressure of short duration and of low amplitude, the pressure created above the closure member 2 moves this latter, when it meets the spring 4, opening the passage 6 which permits the instantaneous flow of the fluid in the direction of the arrow $f_1$. As the initial tension of the spring 4 can be very low and possibly zero, the pressure of the fluid will also remain low. As the hydraulic resistance opposed by the shock absorber is limited to a reduced value and is exerted only during the very short duration of the impact, the effects of the impact will not be felt by the suspended part. On the other hand, the hydraulic resistance opposed by the shock absorber will always be sufficient to combat the slow movements of low frequency, such as the rolling and pitching movements of the suspended part or inclinations when the vehicle takes sharp corners.

During a movement of vibration of greater amplitude, thus of greater duration, the travel of the closure member 2 will be greater, the return action exerted by the spring 2 remaining relatively weak until the transfer channel 6 is closed. The channel 7 of smaller section will be progressively opened (FIG. 3) and will control the passage of the fluid in the direction of arrow $f_2$, this having for its effect a rapid increase in the pressure of the fluid and the return stress of the spring 4 which at each instant is called to balance the pressure of the fluid, determined by the instantaneous values of the speed and of the section of passage. Thus, the hydraulic resistance of the shock absorber to the high amplitude vibrations may easily be determined, as a function of the desired damping, independently of the damping of vibrations of low amplitude.

FIG. 3 shows that the beginning of the channel 7 of smaller section is arranged, with respect to the channel of larger section, so as to permit a certain outflow through the channel 7 before complete closure of the channel 6, in order to guarantee a certain continuity of passage of the fluid in the case of vibrations of high amplitude.

In certain cases, it may be advantageous to provide two return springs for the closure member.

The closure member 2 is then returned to its closing position by a spring 8 of smaller loading, intended for damping low amplitude vibrations; the spring 4, intended for damping high amplitude vibrations, acts on a cup 9 provided with slots 10 for passage of the liquid, and on which the closure member 2 is supported before the channel 6 is closed. This arrangement enables the spring 4 to be given a fairly high initial tension, without harming the resilience of the damping of the vibrations.

FIG. 4 also shows that the channel 7 of smaller section, provided on the side opposite the channel 6, may be replaced by a channel 7', arranged in line with the channel 6.

FIG. 5 shows a modified embodiment according to which the valve comprises two combined closure member, each constituted by an annular membrane and disposed on a common body which may be constituted by the piston of the shock absorber.

A body 11, constituting the piston of the damper, is fixed to the piston rod 12 by means of a nut 13 and moves inside the working cylinder 14 of the shock absorber. The periphery of an elastic annular membrane 15, which may be formed by stacking a plurality of small discs, rests on a seat 16 arranged on the body 11, under the action of a small flat spring 17, held on the rod 12 by a ring 18. On the opposite side of the body 11 is disposed a second elastic membrane 19, similar to membrane 15, and supported by its periphery on a circular seat 20 made on the body 11. The membrane 19 is applied to the seat 20 by a shoulder 21 of the nut without initial tension or under a small initial tension.

The membranes 15 and 19 may slide, with a very slight clearance, over cylindrical parts 22 and 23 respectively made on the rod 12 and the nut 13, and form with the body 11 two chambers 24 and 25 which communicate with one another by holes 26.

On the rod 12 there are arranged a channel of large section, constituted by a groove 27, and a channel 29 of smaller section. Similarly, the nut 13 is provided with a channel of large section, constituted by a groove 28, and with a channel 30 of smaller section. The channels 27, 28 and 29, 30 correspond respectively to channels 6 and 7 of FIGS. 1 to 4.

The operation of a valve with closure members constituted by the membranes 15 and 19 is similar to that described above for the closure members with spring-assisted return.

In the rest positions, the membranes 15 and 19 close all the channels 27, 28, 29 and 30. Upon a rapid impact of low amplitude, for example, a downward impact, the lower membrane 19 may bend under the effect of a pressure, even a very small pressure, and may open the channel 28 of large section, as shown in dotted lines at the bottom of FIG. 5. The fluid easily flows through the channel 28, the holes 26 and through the periphery of the opposite membrane 15, in the direction of arrow $f_3$, without creating an appreciable hydraulic resistance.

Upon a movement of greater amplitude, for example, an upward movement, the upper membrane 15 covers the channel 27 of large section. The fluid can then pass only through the channel 29 of small section, in the direction of arrow $f_4$; the pressure rises rapidly and bends the membrane 15 to the form of a spherical cup, as shown in dotted lines, until a balance is created between the pressure of the fluid and the tension of the membrane.

The slow vibratory movements will be braked by reason of the pressure, even a small pressure, which is necessary for producing the initial bending of the membranes 15 and/or 19.

I claim:

1. A hydraulic valve of the kind having double flow control means, for motor vehicle shock absorbers, comprising a movable closure member subjected to operating fluid pressure and having at least two separate channels formed therein of differing section for the passage of said fluid, said channels being mutually displaced in the direction of the displacements of the closure member, by a support forming a valve seat for said member, said channels being related to said valve seat in a manner such that the channel of larger section is opened by displacements of small amplitude of said closure member, under the effect of instantaneous pressures of said fluid and the channel of smaller section is substituted for said channel of larger section by displacements of higher amplitude of said closure member.

2. A hydraulic valve according to claim 1, wherein resilient means act on said closure member in the rest position of said closure member, the force of said resilient means being smaller than the action exerted on said member by the pressures of said fluid resulting from slow oscillations.

3. A hydraulic valve according to claim 2, wherein said means are two springs of different characteristics, the weaker of said springs adjusting the displacements of said closure member during the opening of said channel of larger section, the combined action of the two springs adjusting the displacements of high amplitude of said closure member.

4. A hydraulic valve according to claim 1, wherein said closure member is a piston in which are arranged said separate channels for the passage of said fluid and which is guided in said support, said valve seat in said support covering said channels in the rest position of said closure member.